Figure 1:
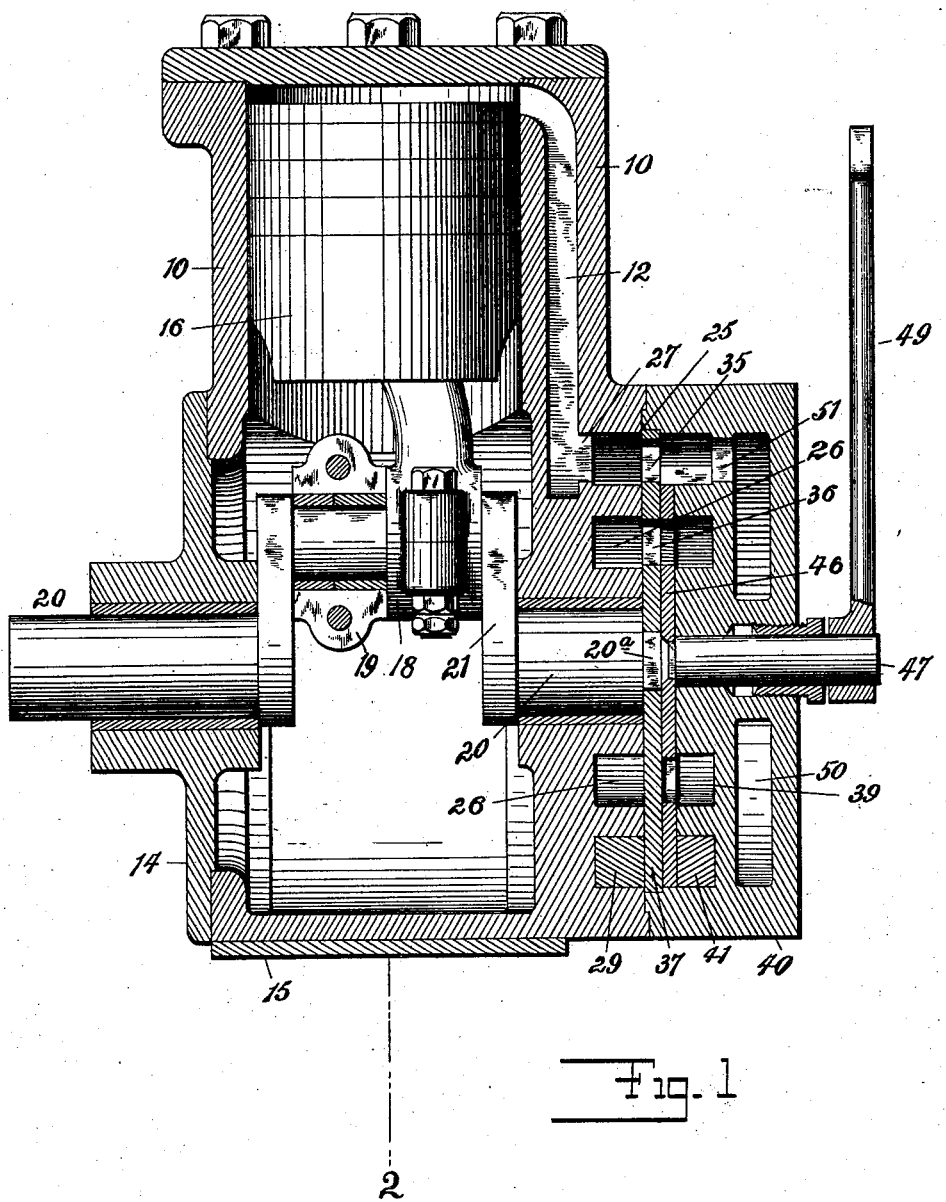

No. 690,743. Patented Jan. 7, 1902.
J. LA BURT.
CUT-OFF VALVE.
(Application filed July 6, 1901.)

(No Model.) 3 Sheets—Sheet 1.

WITNESSES: INVENTOR
John La Burt,
BY
ATTORNEY

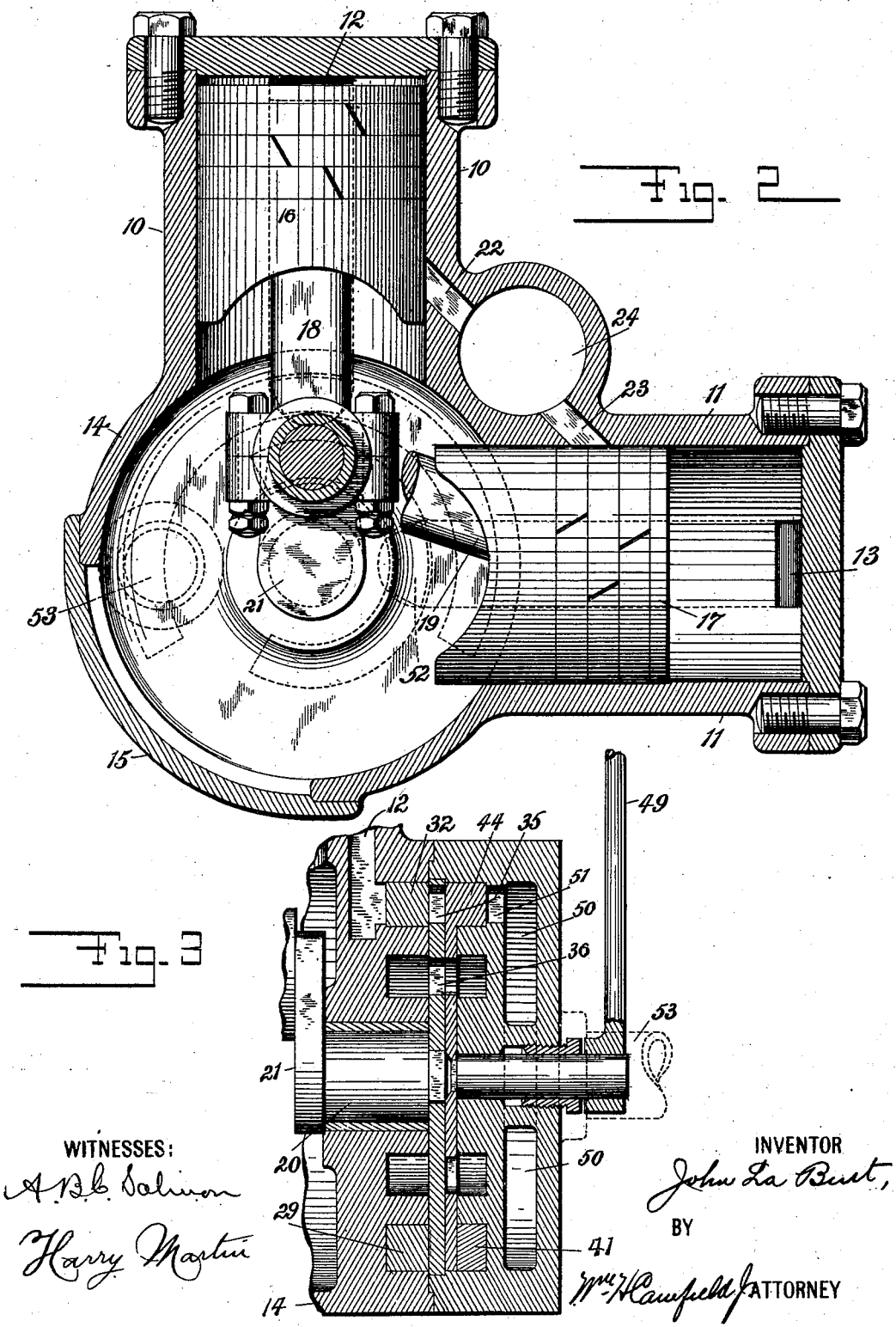

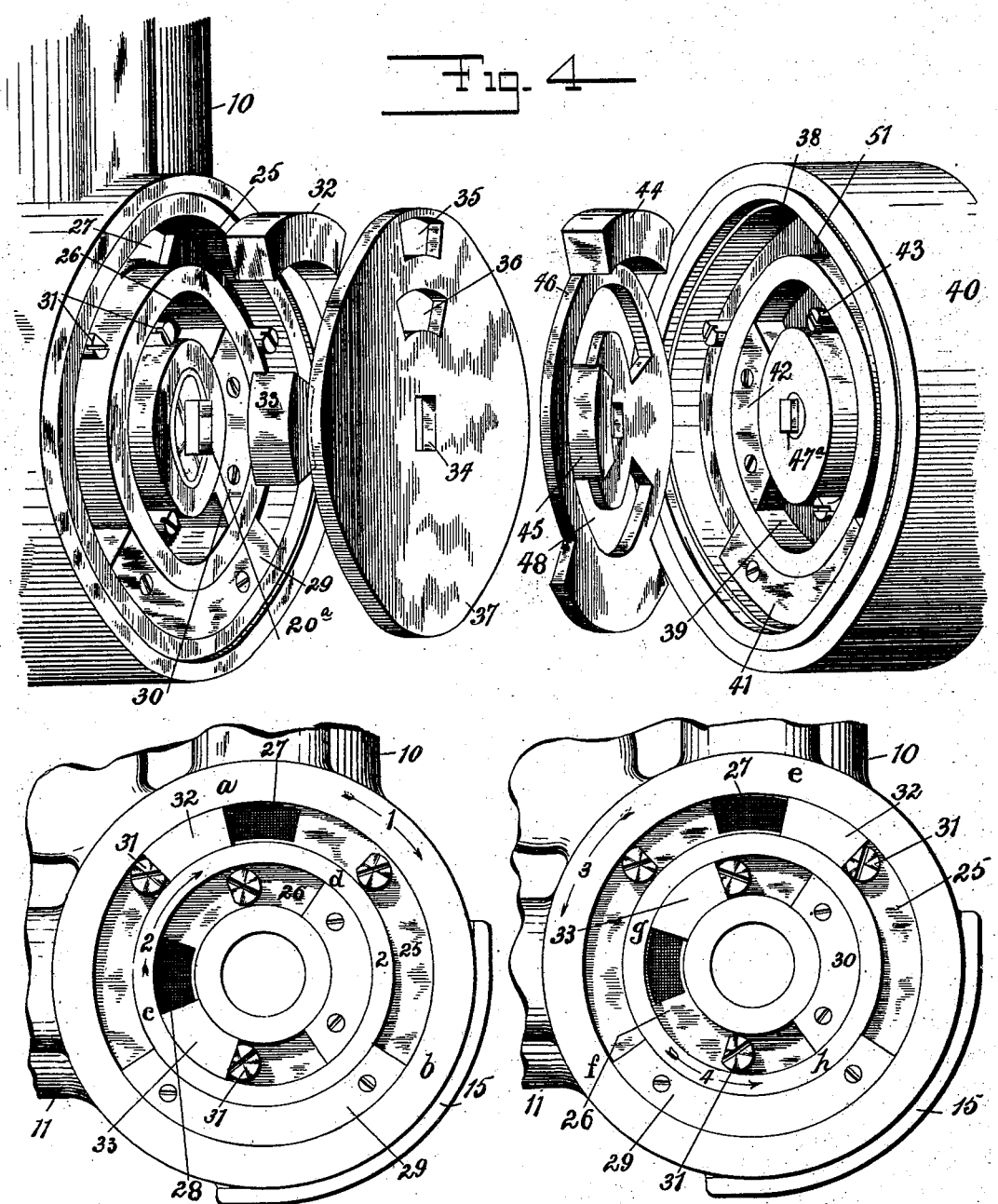

UNITED STATES PATENT OFFICE.

JOHN LA BURT, OF BROOKLYN, NEW YORK, ASSIGNOR TO HENRY A. KESSEL AND ANDREW OLSEN, OF BROOKLYN, NEW YORK.

CUT-OFF VALVE.

SPECIFICATION forming part of Letters Patent No. 690,743, dated January 7, 1902.

Application filed July 6, 1901. Serial No. 67,275. (No model.)

*To all whom it may concern:*

Be it known that I, JOHN LA BURT, a citizen of the United States, residing in the borough of Brooklyn, in the county of Kings and State of New York, have invented certain new and useful Improvements in Cut-Off Valves; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention has reference to a novel construction of valve that is cheap to manufacture and positive in its action and which action is assured on account of its simplicity.

In my new valve herein described I regulate the admission of the motive power to two or more cylinders placed at an angle to one another and in which I can reverse the engine and also regulate the speed in either direction with a common lever.

My device may be employed on any engine; but it is particularly adapted for small engines, such as are used on automobiles and other self-propelling vehicles.

My invention is illustrated in the accompanying drawings, in which—

Figure 1 is a vertical section through a cylinder of the engine and through the valve with the ports open. Fig. 2 is a section on line 2 2 in Fig. 1; and Fig. 3 is a section of the valve, similar to Fig. 1, with the ports closed. Fig. 4 is a perspective view of the parts of the valve, showing their individual construction. Figs. 5 and 6 are face views of the valve with the cut-off plate and casing removed, showing the position of the blocks in the valve at the forward and reverse positions.

In the views, 10 and 11 are two cylinders placed at right angles to one another and provided with the respective steam-inlet ports 12 and 13. Integral with said cylinders is the casing 14, provided with the removable plate 15 for repairing and cleaning the mechanism. The pistons 16 and 17 reciprocate in the cylinders 10 and 11, respectively, and are connected by the piston-rods 18 and 19 with the crank 21 of the shaft 20, as will be understood from Figs. 1 and 2. The exhaust-ports 22 and 23 communicate with the exhaust-pipe 24.

On the same axis as the shaft 20 I provide a pair of circular slots 25 and 26, which are connected by the openings 27 and 28 with the inlet-ports 12 and 13, respectively. Cut-off blocks 29 and 30 are inserted in said slots and diametrically opposite the openings 27 and 28, which are at right angles to each other, and I also provide the stops 31 for the sliding valve-blocks 32 and 33, which ride in the circular slots.

The circular portion of the shaft 20 runs out flush with the face of the casing (see Fig. 1) and is provided with a squared end $20^a$, which fits into a perforation 34 on the cut-off plate 37, and said plate 37 is also provided with a pair of steam-ports 35 and 36, which are in line with one another in a radial direction. Said plate 37 fits against the face of the engine-frame and the blocks 29 and 30 and forms the remaining side of the chambers inclosing the valve-blocks 32 and 33. Fitting against said frame is the casing 40, which has the circular slots 38 and 39, which correspond and are in line with the slots 25 and 26, respectively, and are provided with the blocks 41 and 42 and the stops 43. These stops act to limit the movement of two lugs 44 and 45, which are of the same size as the blocks 32 and 33, are also disposed at right angles to each other, and are integral with a plate 46, which fits in the front of the casing 40 and rotates on a shaft 47 with a squared end $47^a$. The plate 46 is also provided with a slot 48 of similar shape to the slot 39, and its circumferential edge is cut away except at the point coincident with the block 42 and the lug 45. The shaft 46 is provided with a suitable actuating-lever 49, as will be evident.

The casing 40 has a circularly-disposed steam-chest 50, which has the ports 51 and 52 communicating with the slots 38 and 39, respectively. A steam-inlet pipe 53 feeds the said chest, as will be seen from Figs. 2 and 3.

When the several parts are assembled and placed in position, as in Fig. 1, in the relative positions shown in Fig. 4, the ports from the steam-chest 50 to the ports 12 and 13 are closed by reason of the lugs 44 and 55, which fit on the openings 51 and 52, which are at right angles. Now suppose the lever 49 is thrown in one direction. It will carry the plate 46, with the lugs 44 and 45, until they are lodged against the stops 43. The steam passes from the steam-chest through the port 51 and into the circular chambers 25 and 38 and also the chambers 26 and 39. This pressure throws the valve-blocks 32 and 33 the same way, and they are forced against the stops 31 and will stay there on account of the pressure. The steam is then free to pass out through the port 12, and the piston 16 is driven thereby. Now if the lever is thrown the other way the lugs are necessarily carried against the opposite stops, and steam fills the other portion of the chambers 25, 38, 26, and 39, and the valve-blocks 32 and 33 are actuated by the steam and change correspondingly, in which case the port 13 would receive the steam first and the engine would be reversed. The cut-off plate 37 rotates with the shaft of the engine, as in Figs. 1 and 3, and as the ports 35 and 36 are in line radially and the ports in the engine-frame and in the steam-chest are at right angles to each other the admission of steam to the cylinders is intermittent. The pressure exerted would be of a duration sufficient to cause the opening 35 in cut-off plate to travel (see Fig. 5) in the direction of arrow 1 from *a* to *b* and also in the direction of arrow 2 from *c* to *d*. If the lever 49 is reversed, as in Fig. 6, the openings 35 and 36 in the cut-off plate would travel in the directions of arrows 3 and 4—from *e* to *f* and from *g* to *h*, respectively—being shut off in all cases by the blocks 29, 41, 30, and 42 when the ports in the cut-off plate passed over them.

It will be evident that by means of the lugs 44 and 45 the amount of steam admitted to the cylinders can be regulated and the speed of the engine governed. The lever 49 therefore answers the purpose of a combined throttle and reversing lever.

I may employ more cylinders, all that is necessary being to provide additional rings for each cylinder and the necessary lugs and valve-block in each ring or circular slot. An additional opening in the cut-off plate would be necessary and in line with other ports, as the ports in the cut-off plate should be in line radially, and openings in the chest and the frame, placed at equidistant points in the circumference, in line with center of cylinders.

It will be seen from this description that I have devised a valve of the rotary pattern that is simple and operative in the construction shown; but I may make minor changes in the construction of the parts without departing from the scope of my invention.

Having thus described my invention, what I claim is—

1. In a valve, two pairs of steam-chambers, a cut-off plate and a controller-plate rotatively arranged between them, said cut-off plate rotating with the shaft of the engine, and means for independently actuating the controller-plate, substantially as set forth.

2. In a valve, two pairs of steam-chambers, a sliding valve-block in each of one pair of chambers, a cut-off plate and a controller-plate rotatively arranged between the pairs of chambers, the cut-off plate rotating with the shaft of the engine, and means for independently actuating the controller-plate, substantially as set forth.

3. In a valve, two pairs of steam-chambers, a sliding valve-block in each of one pair of chambers, a cut-off plate and a controller-plate rotatively arranged between the pairs of chambers, said controller-plate being provided with lugs fitting in the other pair of chambers, a lever and shaft controlling the controller-plate, the cut-off plate rotating with the shaft of the engine, substantially as set forth.

4. In a valve, two pairs of steam-chambers, a sliding valve-block in each of one pair of plates a cut-off plate and a controller-plate rotatively arranged between the pairs of chambers, said controller-plate being actuated by a shaft and lever, and having lugs thereon extending into the other pair of chambers, stops in said chambers for the controller-plate and valve-blocks, said cut-off plate rotating with the engine-shaft, substantially as set forth.

5. In a valve, a pair of chambers connected with the ports of a pair of cylinders, valve-blocks in said chambers, a pair of chambers connected by ports with a steam-chest, a cut-off plate and a controller-plate rotatively arranged between said pairs of chambers, lugs on the controller-plate projecting into the pair of chambers connected with the steam-chest, stops in said chambers to limit the movement of the valve-blocks and the controller-plate, said cut-off plate rotating with the shaft of the engine, substantially as set forth.

6. In a valve, a pair of chambers connected by ports with the ports of a pair of cylinders, valve-blocks in said chambers, a pair of chambers connected by ports with a steam-chest, circular controller-plate and cut-off plate rotatively arranged between the pairs of chambers, lugs on the controller-plate fitting into the pair of chambers connected with steam-chest, stops in the chambers limiting the movement of the valve-blocks and the controller-plate.

7. In a valve, a pair of chambers connected with the ports of a pair of cylinders by ports arranged at right angles, a valve-block in each chamber, a pair of chambers connected with a steam-chest by ports arranged in line with the ports of the other pairs of chambers, a controller-plate and a cut-off plate rotatively arranged between the pairs of chambers, lugs on the controller-plate, at right angles, projecting into the pair of chambers connected with the steam-chest, stops in the chambers limiting the movement of the controller-plate and valve-blocks, the cut-off plate rotating with the shaft of the engine substantially as set forth.

8. In a valve, a pair of chambers, connected with the ports of a pair of cylinders by ports arranged at right angles, a valve-block in each chamber, a pair of chambers connected with a steam-chest by ports arranged in line with the ports of the other pair of chambers, a controller-plate and a cut-off plate rotatively arranged between the pairs of chambers, lugs on the controller-plate at right angles, projecting into the pair of chambers connected with the steam-chest, stops in the chambers limiting the movement of the controller-plate and valve-blocks, the cut-off plate being provided with ports radially in line, and rotating with the shaft of the engine, substantially as set forth.

9. In a valve, a pair of chambers connected with the ports of a pair of cylinders by ports arranged at right angles, a valve-block in each chamber, stops to limit the movement of said blocks, a pair of chambers connected with a steam-chest by ports arranged in line with the ports in the other pair of chambers, a controller-plate and a cut-off plate rotatively arranged between the pairs of chambers, cut-away portions on the controller-plate corresponding to the chambers, lugs projecting from the controller-plate into said chambers, stops to limit the movement of the lugs of the controller-plate, the cut-off plate being provided with ports radially in line, and rotating with the shaft of the engine, substantially as set forth.

10. In a valve, a bed-plate provided with a pair of chambers, ports arranged at a right angle communicating from said chambers to the inlet-ports of a pair of cylinders, sliding valve-blocks in said chambers, stops limiting the movement of said blocks either side of the ports, a casing on said bed-plate provided with a steam-chest, and pair of chambers, ports connecting them, the ports and chambers being in line with those on the bed-plate, a controller-plate and a cut-off plate rotatively arranged between said pairs of chambers, said controller-plate being actuated by a shaft, and provided with cut-away portions corresponding to the chambers and lugs arranged at right angles projecting into the chambers, the cut-off plate being provided with ports arranged radially in line and of the same radii as the chambers, said cut-off plate rotating with the shaft of the engine, substantially as set forth.

In testimony that I claim the invention set forth above I have hereunto set my hand this 28th day of June, 1901.

JOHN LA BURT.

Witnesses:
 WM. H. CAMFIELD, Jr.,
 HARRY MARTIN.